3,308,091
STABILIZED POLYAMIDES CONTAINING CUPRIC ACETATE, CUPRIC CHLORIDE AND 2-MERCAPTOBENZOTHIAZOLE
John Adam Zapp, Jr., Kennett Square, Pa., assignor to E. I. du Pont de Nemours and Company, Wilmington, Del., a corporation of Delaware
No Drawing. Filed June 24, 1963, Ser. No. 290,198
7 Claims. (Cl. 260—45.75)

This invention relates to a nylon composition suitable for use under conditions of high temperature and high humidity. More particularly, this invention relates to a nylon composition that may be used under conditions of high temperature, and high humidity in the presence of and in contact with food for human consumption without adversely affecting the properties of food. Specifically, this invention relates to a nylon composition that may be used in contact with hot beverages without degrading the nylon and without adversely affecting the beverage.

Over a period of years considerable research attention has been directed to developing an effective stabilization system for nylon under conditions of high humidity and relatively high temperature (about 100° C.). Although some success has been achieved in this area, prior to this invention no stabilized nylon composition was available that could be used in contact with hot food for human consumption, for the materials added to the nylon to stabilize it against hydrolytic and oxidative degradation were quite toxic.

It is an object of this invention to provide a nylon composition that is stable under conditions of high humidity and high temperature, and which may be used in contact with hot food for human consumption without adversely affecting the properties of the food. It is a further object of this invention to produce a nylon composition which may be molded or extruded to form a beverage dispensing device to be used to dispense hot chocolate, tea, coffee, and the like. Other objects of this invention will be obvious to one skilled in the art from the remainder of the specification.

The above objects are accomplished and the above difficulties overcome by producing a nylon composition having an excess of amine ends over carboxyl ends and containing a mixture of cupric acetate, cupric chloride and 2-mercaptobenzothiazole, or the copper salt of 2-mercaptobenzothiazole.

The nylons useful in the composition of the present invention are long chain synthetic polymeric amides having recurring amide groups, i.e.,

where R is hydrogen or a monovalent hydrocarbon radical having 1 to 10 carbon atoms as an integral part of the resin polymer chains. The average number of carbon atoms separating the amide groups is at least two. These polymers are capable of being formed into filaments in which the structural elements are oriented in the direction of the filament axis. The nylons in the composition of this invention may be prepared, for example, by the condensation reaction of hexamethylene diamine and adipic acid or sebacic acid or by polymerizing epsilon caprolactam in the presence of a diamine. In general, the nylons should have an inherent viscosity of between about 0.75 and 1.70, where inherent viscosity is defined as $\eta$ rel./C, $\eta$ rel. being the efflux time of a 0.5 g./100 cc. solution of the polymer in 98% meta-cresol divided by the efflux time of 98% meta-cresol, the efflux times for the solution and solvent being measured in the same viscosity pipet at the same temperature, and C being concentration in g./100 cc. The nylons in the composition of this invention are readily processable by injection molding or by extrusion to form useful articles.

The nylons in the composition of this invention must have an excess of amine end groups over carboxyl end groups. As a convenient method of describing the quantity of amine or carboxyl groups, the art has described the excess in terms of the number of gram equivalents of amine groups that are present in excess of the number of carboxyl groups per $10^6$ grams of polymer. See Journal of American Chemical Society, vol. 69, pp. 635–638 (1947). In the nylons used in the present invention, the excess must be within the range of about 20 to 140 and preferably 40 to 100 gram equivalents of amine groups in excess of the number of equivalents of carboxyl groups per $10^6$ grams of polymer.

The concentration of carboxyl end groups in polyamide resin is determined as follows: a solution of 1 N NaOH in aqueous methanol is diluted to 0.1 N concentration with benzyl alcohol and standardized against pure benzoic acid with phenolphthalein indicator. About 3 grams of the polyamide is weighed and dissolved in 75 ml. benzyl alcohol at 185–200° C. The hot solution is titrated to a phenolphthalein end point with 0.1 N NaOH described above.

A blank is titrated in the same way with 75 ml. of benzyl alcohol. The net titer is the sample titer less the blank titer.

$$\frac{\text{net titer} \times \text{N NaOH} \times 10^6}{\text{a sample wt., g.} \times 10^3} = \text{carboxyl equivalents}/10^6 \text{ g.}$$

The concentration of amine end groups in polyamide resin is determined as follows: a solution of perchloric acid approximately 0.05 N in methanol is prepared and standardized by titration with 0.1 N NaOH in methanol to the phenolphthalein end point. About 3 grams of the polyamide is weighed and dissolved in 75 ml. of redistilled meta-cresol. Ten ml. of methanol is added. The pH of the stirred solution is measured by means of an electrode pair, glass and silver-silver chloride, while standardized perchloric acid solution is introduced by a buret whose tip is immersed in the polyamide solution. A plot of acid volume on the abscissa vs. pH on the ordinate is made. The equivalence point is taken as the midpoint of the straight portion of the most nearly vertical part of the curve.

The composition of this invention contains between about 0.02 and about 0.08 percent by weight of the composition of cupric chloride, between about 0.02 and about 0.08 percent by weight of the composition of cupric acetate, and about 0.05 to 0.5 percent by weight of the composition 2-mercaptobenzothiazole or its copper salt, i.e., the chemical compounds corresponding to the formula:

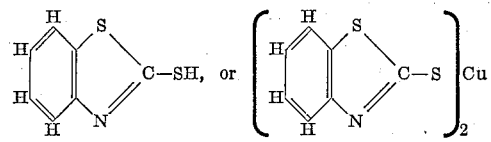

The 2-mercaptobenzothiazole or its copper salt and the copper compounds may be introduced into the nylon composition after polymerization reaction is complete, during polymerization, or prior to polymerization, for the stabilizers are relatively non-volatile. The 2-mercaptobenzothiazole or its copper salt may be added as a solid or in solution, e.g., an ethanol solution. Other additives such as dyes, pigments, and other stabilizers may also be present so long as they do not affect the basic characteristics of the composition.

In the following examples all parts and percentages are in parts by weight unless otherwise specified.

EXAMPLE I

One hundred and forty-three pounds of a 50.61% aqueous solution of hexamethylene diammonium adipate was concentrated by vacuum distillation, and the resulting solution was transferred to a jacketed, stirred autoclave. To the solution was added a solution of 13.6 g. each (0.048 wt. percent of polymer) of cupric chloride dihydrate and cupric acetate monohydrate in about 200 ml. of distilled water, 60.8 g. (0.215 wt. percent of polymer) of 2-mercaptobenzothiazole in solid form, and 242 g. of an 84% aqueuos solution of hexamethylene diamine (dry diamine equivalent to 0.715 wt. percent of polymer). The mixture was subjected to polymerization for approximately 5 hours at temperatures up to 285° C. and at pressures from 250 to 0 p.s.i.g. The molten polymer was extruded with the assistance of inert gas pressure through a flat ribbon die, quenched, and cut into pieces suitable for use in an injection molding machine. The product so obtained was dried to a moisture content of about 0.2 wt. percent. The inherent viscosity (0.5 g. polymer/100 ml. meta-cresol at 25° C.) of this resin was 1.35 deciliters/gram. Analysis showed an excess of amine ends amounting to 37.7 equivalents per million grams of polymer.

Test specimens were made from this resin by injection molding. Specimens were exposed to boiling water for long periods and others were subjected to the accelerated hydrolysis oxidation test. The accelerated hydrolysis oxidation test consists of exposure under water in an autoclave containing air at 140–144° C. for 64 hours followed by exposure to air saturated with water vapor at 140–144° C. for 16 hours. All specimens were conditioned to 50% relative humidity before testing. The results are compared below with similarly prepared resins of different composition.

The results show that the composition of this invention is very stable and not subject to extraction to an appreciable extent by any of the above common solvents.

I claim:
1. A hydrolysis and oxidation resistant long chain fiber forming polymeric amide having recurring amide groups as an integral part of the polymer chain having 20 to 140 gram equivalents of amine groups in excess of the number of carboxyl groups per $10^6$ grams of polymer containing between about 0.02 and about 0.08 percent by weight of the composition cupric chloride, between about 0.02 and about 0.08 percent by weight of the composition cupric acetate, and between about 0.05 and about 0.5 percent by weight of the composition of 2-mercaptobenzothiazole.
2. The composition of claim 1 in which the nylon has an inherent viscosity of between 0.75 and 1.70.
3. The composition of claim 2 in which the nylon is linear polyhexamethylene adipamide.
4. The composition of claim 1 in which the number of gram equivalents per $10^6$ grams of polymer of amine groups in excess of the number of carboxyl groups is between 40 and 100.
5. A composition suitable for use in the preparation of molded parts which consists essentially of (1) nylon polymer having recurring amide groups of the formula

where R is selected from the group consisting of hydrogen and monovalent hydrocarbon radicals, as integral parts of the main polymer chain, said nylon polymer having an inherent viscosity of between 0.75 and 1.70, said nylon having per $10^6$ grams of polymer between 20 and

| Sample | Test | Tensile Impact (ft.-lb./in.²) | Inherent Viscosity | Gram equiv. of amine groups in excess of the number of grams equiv. of carboxyl groups |
|---|---|---|---|---|
| 66 Nylon (high NH₂)+0.05% CuCl₂+0.05% Cu(OAc)2+0.22% 2-mercaptobenzothiazole. | Initial Properties | 166 | 1.35 | 37.7 |
| | Accelerated Hydrolysis Oxidation | 186 | 1.07 | |
| | 720 hours Boiling Water | 147 | 1.27 | |
| | 1,500 hours Boiling Water | 181 | 1.21 | |
| 66 Nylon (high NH₂)+0.2% 4,4″butylidene-bis (6 t-butyl meta-cresol). | Initial Properties | 130 | 1.35 | 37.7 |
| | Accelerated Hydrolysis Oxidation | 133 | 1.11 | |
| | 720 hours Boiling Water | 127 | 1.30 | |
| | 1,500 hours Boiling Water | 128 | 1.14 | |
| 66 Nylon (high NH₂)+No additives. | Initial Properties | 144 | 1.35 | 37.7 |
| | Accelerated Hydrolysis Oxidation | 15 | 1.05 | |
| | 720 hours Boiling Water | 139 | 1.29 | |
| | 1,500 hours Boiling Water | 151 | 1.20 | |

EXAMPLE II

A 66 nylon polymer with excess amine ends of 52 equivalents/$1 \times 10^6$ grams of polymer, 0.05% each of cupric acetate and cupric chloride, and 0.22% of 2-mercaptobenzothiazole was prepared as described in Example I. The granules which were approximately 1/16 x 1/16 x 1/16 inch cubes were subjected to extraction tests by boiling 30 grams of the nylon in 300 milliliters of solvent in a 500 milliliter round-bottom flask equipped with a reflux condenser.

140 gram equivalents of amine end groups in excess of the number of carboxyl end groups, (2) between about 0.02 and about 0.08 percent by weight of the composition cupric chloride, (3) between about 0.02 and about 0.08 percent by weight of the composition cupric acetate, and (4) between about 0.05 and about 0.5 percent by weight of the composition 2-mercaptobenzothiazole.
6. The compositon of claim 5 in which the nylon is linear polyhexamethylene adipamide.
7. The composition of claim 6 in which the number of equivalents per $10^6$ grams of polymer of amine end groups in excess of the number of carboxyl groups is between 40 and 100.

| Solvent for 8 hours Extraction at Boil | Total Extracted, percent | Found in Extract, micrograms/gram of resin | |
|---|---|---|---|
| | | Copper | 2-mercaptobenzothiazole |
| Ethyl Acetate | 0.10 | 0.16 | 0.32 |
| Benzene | 0.04 | Nil | 0.32 |
| 95% Ethyl Alcohol | 0.80 | 0.16 | 0.32 |
| Water | 0.84 | 0.33 | 0.32 |

References Cited by the Examiner

FOREIGN PATENTS 890,437  2/1962  Great Britain.
38/16,770  9/1963  Japan.

LELON J. BERCOVITZ, *Primary Examiner.*

G. W. RAUCHFUSS, *Assistant Examiner.*